United States Patent
Kouda et al.

(10) Patent No.: US 6,558,594 B2
(45) Date of Patent: May 6, 2003

(54) POWDER COMPRESSION MOLDING METHOD FOR PRODUCING CATHODE PELLETS FOR DRY CELLS

(75) Inventors: Minoru Kouda, Hirakata (JP); Shigeharu Hattori, Nara (JP); Saburo Nakatsuka, Kyoto (JP); Hiroshi Takebayashi, Hirakata (JP); Toshio Sanukiya, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 196 days.

(21) Appl. No.: 09/769,894

(22) Filed: Jan. 25, 2001

(65) Prior Publication Data

US 2001/0004137 A1 Jun. 21, 2001

Related U.S. Application Data

(63) Continuation-in-part of application No. 08/957,413, filed on Oct. 24, 1997, now abandoned.

(30) Foreign Application Priority Data

Nov. 14, 1996 (JP) .............................................. 8-302960
Nov. 14, 1996 (JP) .............................................. 8-302961

(51) Int. Cl.$^7$ .......................... B29C 43/02; B29C 43/50
(52) U.S. Cl. ...................... 264/105; 264/109; 264/334; 425/78; 425/345; 425/353; 425/356
(58) Field of Search ................................ 264/105, 109, 264/156, 257, 258, DIG. 58, 334; 425/78, 344, 345, 352, 353, 356, DIG. 5

(56) References Cited

U.S. PATENT DOCUMENTS

| | | |
|---|---|---|
| 2,608,826 A | 9/1952 | Haller |
| 3,337,915 A | 8/1967 | Alexander, Jr. |
| 3,577,842 A | 5/1971 | Nakai et al. |
| 3,729,281 A | 4/1973 | Okubo et al. |
| 3,752,622 A | 8/1973 | Viadana |
| 3,773,446 A | 11/1973 | Borrini |
| 3,891,375 A | 6/1975 | Pilewski et al. |
| 3,909,167 A | 9/1975 | Signora |
| 4,008,021 A | 2/1977 | Fedrigo et al. |
| 4,057,381 A | 11/1977 | Korsch |
| 4,168,137 A | 9/1979 | McLain et al. |
| 4,392,800 A | 7/1983 | Apuzzo |
| 5,122,319 A * | 6/1992 | Watanabe et al. ........... 264/109 |
| 5,229,044 A | 7/1993 | Shimada et al. |
| 5,283,139 A | 2/1994 | Newman et al. |
| 5,288,440 A | 2/1994 | Katagiri et al. |
| 5,407,339 A | 4/1995 | Fehlafer |
| 5,478,669 A | 12/1995 | Flack |
| 5,686,118 A | 11/1997 | Kurata |
| 5,698,238 A | 12/1997 | Fabbri |
| 5,874,114 A | 2/1999 | Schrofele |

FOREIGN PATENT DOCUMENTS

| | | |
|---|---|---|
| DE | 2604648 | 6/1977 |
| DE | 305018 | 1/1992 |
| EP | 420404 | 4/1991 |
| JP | 0613270 | 4/1926 |
| JP | 58123668 | 7/1983 |
| JP | 481832 | 2/1994 |
| JP | 623597 | 2/1994 |
| JP | 4109936 | 2/1994 |
| JP | 4206052 | 2/1994 |
| JP | 8007898 | 1/1996 |

* cited by examiner

Primary Examiner—Stefan Staicovici

(57) ABSTRACT

Powder mixture is supplied into a die under a state that a center pin is located lower than the top surface of the die, after which the center pin is lifted up to a given molding position where an annular molding space is defined between the center pin and the die. The powder mixture is then compressed from upper and lower sides with an upper plunger and a lower plunger to form a pellet. The center pin and the lower plunger are simultaneously lifted up to remove the pellet out of the die.

20 Claims, 10 Drawing Sheets

Fig. 1A
Fig. 1B
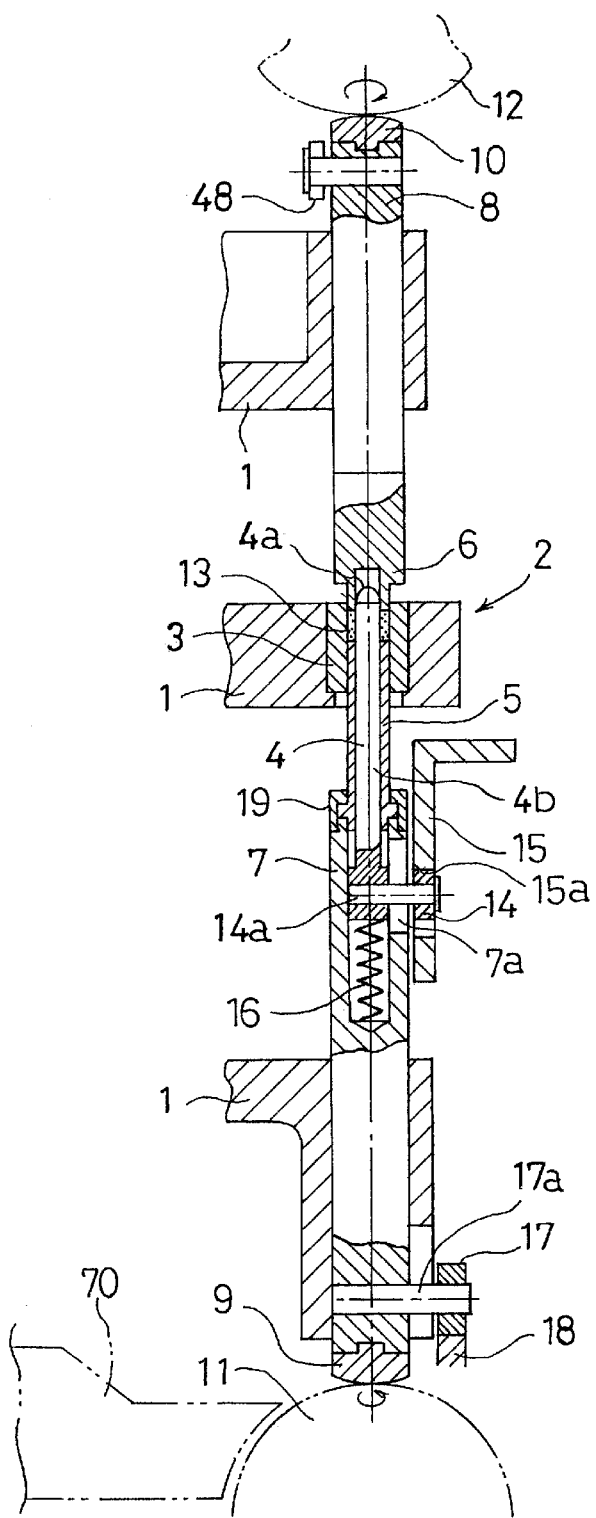
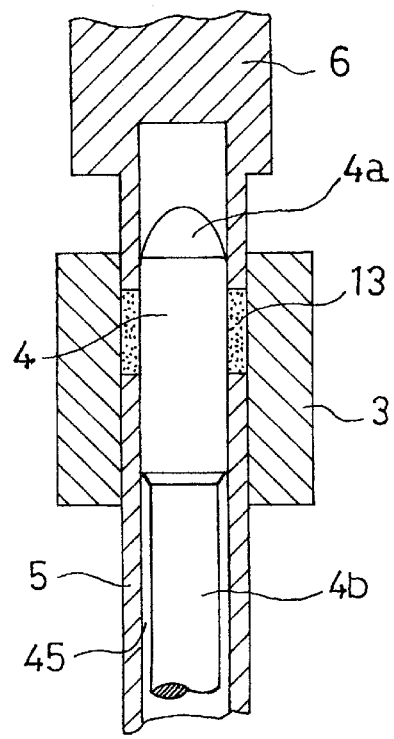

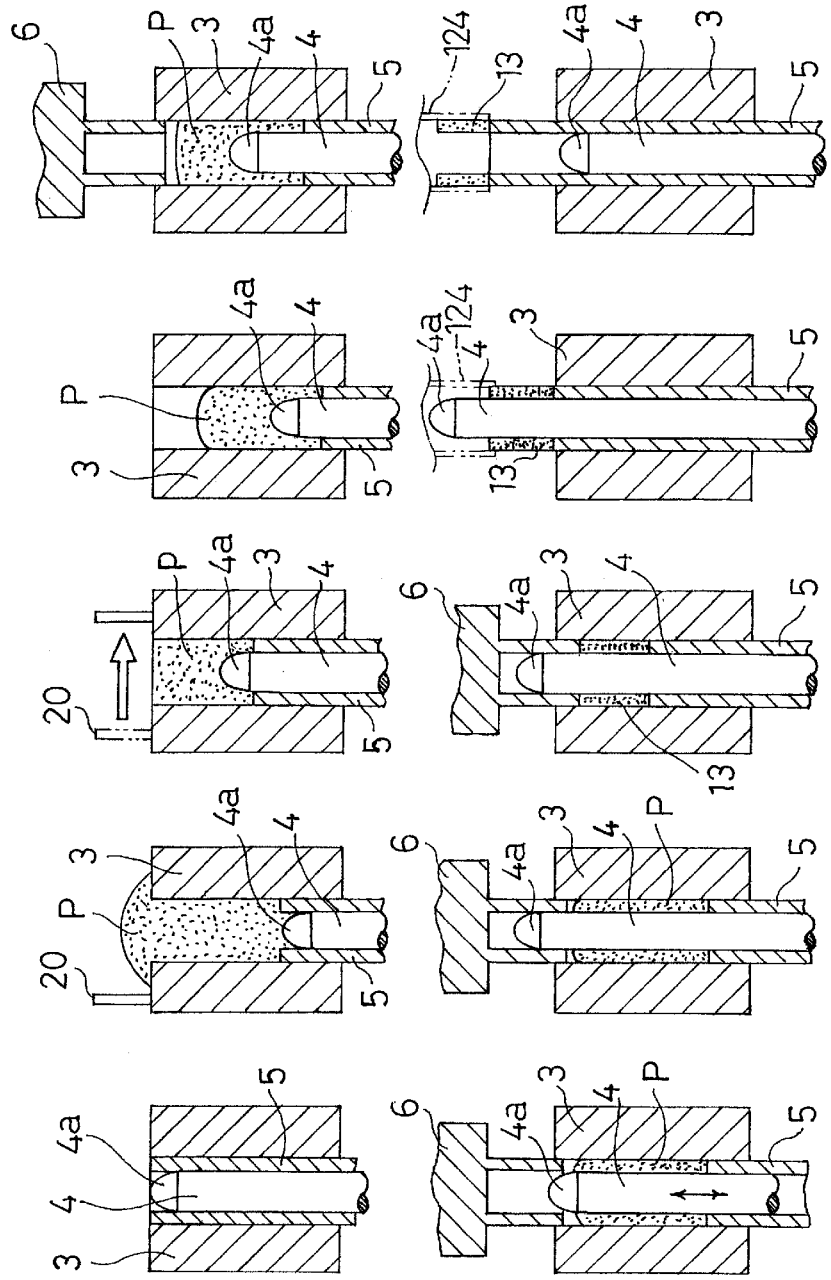

POWDER COMPRESSION MOLDING METHOD FOR PRODUCING CATHODE PELLETS FOR DRY CELLS

This application is a continuation-in-part application of a continued prosecution application of U.S. patent application Ser. No. 08/957,413 filed on Oct. 24, 1997, now abandoned.

BACKGROUND OF THE INVENTION

1. Technical Field of the Invention

The present invention relates to a method and an apparatus for powder compression molding for manufacturing cathode pellets for batteries.

2. Description of Related Art

Molding of powder mixture pellets is generally accomplished with a rotary type compression molding apparatus, wherein a rotary disk carries at its circumferential edge a number of molding units arranged at equal intervals, and as the rotary disk rotates, the molding units successively perform molding actions by means of cam members. FIG. 8 shows one example of prior art arrangement for one such molding unit mounted on a rotary disk. A center pin 34 passing through a lower plunger 35 is fixed to the rotary disk 31 with a fixing pin 44. An upper plunger 36 has a cylindrical cavity to receive therein the top end of the center pin 34. The upper plunger 36 and the lower plunger 35 are respectively pressed in molding directions with an upper pressure roller 39 and a lower pressure roller 38 at predetermined locations on the rotary disk.

FIGS. 9A to 9E illustrate the process steps for molding ring-like pellets with the molding unit of FIG. 8. FIG. 9A illustrates an initial state where a die 33, the lower plunger 35, and the center pin 34 are flush with each other at the top after the previous pellet has been unloaded. When the lower plunger 35 is lowered from its initial position, an annular space for compression molding is formed between the die 33 and the center pin 34 as shown in FIG. 9B. The annular space is then filled with a powder mixture 42. As a feed shoe 43 runs along the top sides of the die 33 and the center pin 34 located flush with each other, an excess of the powder mixture 42 is removed to measure out a predetermined amount to be molded into one pellet 40. This is followed by a step where the upper plunger 36 is lowered and the lower plunger 35 is lifted up as shown in FIG. 9D, by which the powder mixture 42 in the annular space is compressed from upper and lower sides, thus forming the pellet 40. The pellet 40 is then unloaded upwardly from the die 33 by the upward movement of the lower plunger 35 as shown in FIG. 9E and taken out as a compression molded product.

Such conventional procedure of compression molding has, however, a drawback that the powder mixture 42 when being supplied into the annular space between the die 33 and the center pin 34 is likely to produce a bridge across the very small gap between the center pin and the die, particularly when a thin pellet 40 having a small diameter is formed. Because of the bridges frequently formed, it is difficult to constantly supply a given amount of the powder mixture 42, resulting in variations in the weight of pellets 40.

In view of the stringent requirements for uniform and high electrical performance of batteries in recent years, it is extremely important to reduce variations in the battery capacity which is directly determined by the amount of pellets forming the active material of battery. Therefore, it is essential to ensure that each pellet is molded from a predetermined, constant amount of powder mixture, so that pellets are formed with as little variation as possible in their weight and volume.

Another problem associated with the conventional molding apparatus is that the components constituting the cam mechanism for driving the plungers are subject to great stress, and particularly small components, such as the fixing pin 44 in FIG. 8 for fixing the center pin 34, which cannot withstand the stress, often break and must be replaced. For the same reasons the sliding surfaces between the upper and lower plungers and the pressure rollers, and the cams which come to frequent engagement therewith suffer severe abrasion. These are all because the pellet 40 is tightly stuck to the center pin 34 and the die 33 by the pressure given during the compression molding, and a great amount of force is required to push the formed pellet out of the die 33.

Also, since the powder mixture is compressed from the upper and lower sides, the adhesion between the inner side of the resultant pellet and the center pin and that between the outer side of the pellet and the die 33 is very strong. In order to unload the pellet with the lower plunger 35 without damaging the pellet 40, it is the normal practice to provide a tapered surface at a relatively wide angle to the center pin 34 and to provide, correspondingly, an inverted tapered surface to the die 33. Therefore, the resultant pellets 40 are tapered on both inner and outer sides. The amount of the powder mixture contained in one battery is therefore reduced by these tapered portions.

Under the circumstances, several ring-like, tapered pellets are contained in one cell as shown in FIG. 10. As shown, one cell 61 normally contains four ring-like pellets 40 made from a powder mixture consisting of positive electrode active materials because of the small height of pellets. Negative electrode active material is contained within the cylindrical bore hole formed by these ring-like pellets arranged vertically upon one another in a cylindrical cell case, with a separator 64 interposed therebetween.

With such structure, there is still room for more active material to be filled because of the taper as mentioned above. Also, the tapered surfaces of pellets create slight gaps between themselves and the separator 64 and the cell case 62 as can be seen from FIG. 10, because of which smooth flow of electric current is obstructed. Moreover, since the cells need to be filled with four pellets each, the production line involves a considerable number of operations, resulting in low efficiency and high cost. Therefore, it is extremely desirable that pellets for batteries be formed with a greater height and with as little taper as possible.

Usually, ring-like pellets produced by the compression molding machine as described above are transferred by belt conveyors or parts feeders to a next step in which they are loaded into cell cases. However, since the molded pellets tend to be broken at their edges during transportation, those steps are hardly carried out at a high speed. Specifically, the pellets for alkaline manganese dry cells are composed of a mixture of manganese dioxide and graphite with a binder, and these are extremely fragile and liable to chipping even with a slight shock. Also, the entire system including the compression molding machine, conveyors, and automatic loaders is bulky and not adaptable for mass production at high speed.

These problems have previously been addressed by packing a powder mixture in a cell case and compression-molding it within the cell case, as disclosed in U.S. Pat. Nos. 3,577,842 and No. 3,729,281. With such methods, while a strong bond is obtained between the case and the shaped mold of the powder, the density of the mold thus shaped is relatively low, because it is molded within the confined space of cell case from which air cannot escape, and because the powder is compressed from only one direction, i.e., from the open end side of the cell cases. Also, because the center pin inherently has a flat top end, there is a problem that powder sticks thereto. Moreover, the center pin must have a tapered surface for facilitating removal from the shaped mold, which presents the disadvantages described above.

BRIEF SUMMARY OF THE INVENTION

In view of the foregoing, it is an object of the present invention to provide an improved powder compression molding method and an apparatus for producing high and hollow cylindrical pellets, of which inner side is not tapered at all and of which outer side is substantially not tapered.

Another object of the present invention is to improve measurement precision of powder mixture to be molded into pellets, so that resultant pellets have as little variation as possible in weight.

It is yet another object of the present invention to provide a compact rotary type powder compression molding assembly system that is adaptable for mass production and high speed production.

To accomplish the above-mentioned objects, the present invention provides a powder compression molding method comprising the steps of:

lowering a lower plunger and a center pin both mounted coaxially in a cylindrical die to a first position;

supplying a powder into the cylindrical die;

lifting the lower plunger and the center pin to a second position;

removing an extra of the powder to cause a given amount of the powder corresponding to one pellet to remain in the die;

lowering an upper plunger to close the die at a top end thereof with a lower end of the upper plunger;

lifting up the center pin to extend through the powder, thereby defining an annular molding space between itself and the cylindrical die;

compressing the powder in the annular space with the upper plunger and the lower plunger;

lifting up the center pin simultaneously with the lower plunger to push a formed pellet upwardly to the outside; and withdrawing the center pin from the pellet after the center pin and the pellet have been transferred from the annular molding space.

According to the method of the present invention, since the center pin mounted coaxially within the cylindrical die and arranged movable is lowered before the powder is supplied into the die, there is no risk that bridges of powder are formed within the die. The center pin may be vertically reciprocated several times during the step of supplying the powder mixture into the die, so that any bridges that may be formed within the confined space in the die are destroyed. Moreover, after the powder is supplied and the heap of the powder is leveled with a shoe along the top surface of the die so that the die is filled precisely with a predetermined amount of powder, the lower plunger is lowered to cause the powder to sink to a position lower than the top surface of the die. The upper plunger is then lowered to close the upper open end of the die, so that the precisely measured amount of powder remains in the die. The center pin is then lifted up to its molding position, and on its way upwards, the center pin is vertically reciprocated a plurality of times. In this process, any powder that may have remained on the tip of the center pin is completely removed. Thus the annular molding space can be filled with a constant amount of the powder mixture, whereby pellets of uniform weight and density can be formed stably.

After the compression molding of the powder mixture, the center pin is simultaneously lifted up with the lower plunger so as to push up the formed pellet out of the die, after which the center pin is withdrawn from the pellet. Since the formed pellet is subject to a large compressive force after the molding in the die, there is strong adhesion between the inner surface of the pellet and the center pin and, if an attempt were to be made to eject the pellet only by the action of the lower plunger, it would be necessary to apply a considerable amount of force to the upward movement of the lower plunger, resulting in the problems mentioned above. Also, a wide-angled taper would have to be provided to both of the center pin and the die to facilitate the removal of the pellet. The present invention provides a method which solves all of these problems, in which the center pin is controlled to be lifted together with the lower plunger with the formed pellet still held thereon. Thereby, the formed pellet can be taken out of the die with a much smaller amount of force. The pellet, when moved to the outside, is released from the compressing stress of the die, whereupon the contact between the inner surface of the pellet and the center pin is lessened, as a result of which the center pin can be readily withdrawn from the pellet afterwards. Accordingly, the center pin need not have a tapered surface as in the prior art, and the amount of powder per one pellet can be increased by the tapered portion which was previously necessary.

The tubular pellets thus formed are very thin and high, and must be handled with great care. According to the method of the present invention, pellets are inserted into a cylindrical container which is held in position over and in alignment with the cylindrical die immediately after the molding. Each cylindrical container is held by respective convey jigs throughout the process, ensuring that the containers do not fall or tilt. Therefore there is no risk that the formed pellets are physically damaged, and molding and assembling of pellets for batteries can be accomplished simply at low cost.

In order to implement the above described method, the present invention provides a powder compression molding apparatus comprising:

a molding unit including a cylindrical die, a center pin disposed at the axial center of the die, and a lower plunger and an upper plunger for compressing a powder mixture supplied in an annular molding space defined between the die and the center pin into a ring configuration, the lower plunger and the center pin being arranged to be movable in the axial direction in relation to each other as well as to the die in a powder fill mode and to further eject cooperatively the molded ring configuration into a cylindrical container;

an upper lifting shaft, to the lower end of which the upper plunger is secured;

an upper plunger actuating means including a first upper plunger cam follower detachably coupled to the upper end of the upper lifting shaft, and a pressure roller engaging with the first upper plunger cam follower, for driving the upper plunger to perform a compression molding action in the die;

a second upper plunger cam follower connected to the upper lifting shaft for lowering the upper plunger to close the upper open end of the die with the lower end of the upper plunger prior to the compression molding action;

a lower lifting shaft, to the upper end of which the lower plunger is secured and within which the center pin is coaxially disposed for relative sliding movements, the lower lifting shaft including a hollow cavity and supports therein a biasing spring to bias the center pin upward;

a lower plunger actuating means including a lower plunger cam follower detachably coupled to the lower end of the lower lifting shaft and a pressure roller engaging with the lower plunger cam follower for driving the lower plunger to perform the compression molding action in the die together with the upper plunger;

a cam for carrying out an ejecting operation to move the lower plunger upwardly to push the molded ring configuration out of the die;

a center pin actuating means including a center pin cam follower connected to the center pin through the lower lifting shaft, and a center pin actuating cam engaging with the center pin cam follower for moving the center pin upwardly to the molding position after being moved downwardly to locate lower than the top surface of the die, and for carrying out the ejecting operation to move the center pin upwardly simultaneously with the lower plunger.

The center pin actuating cam constituting the center pin actuating means has a cam surface only at a lower side thereof, and the biasing spring detachably presses the center pin cam follower connected to the center pin against the cam surface of the center pin actuating cam. Thus, the center pin cam follower is urged upward towards the cam surface of the center pin actuating cam, so as to enable the center pin to perform each action sensitively in accordance with the configuration of the cam surface. Moreover, any downward stress exerted to the center pin is absorbed by the contracting action of the spring and does not directly act on the center pin. This permits the lower part of the center pin to be of a reduced diameter and to remain intact as well as preventing any damage or bending to the cam follower shaft. Furthermore, the center pin actuating means is configured such as to cause the center pin to vertically reciprocate more than once before forcing an upper end of the center pin above the powder mixture in a pre-mold preparatory operation.

As mentioned above, because at least the inner side of the pellet need not be tapered, the center pin has a straight side face, and a pointed tip, in order to facilitate removal of any remnants of powder thereon.

These and other objects, features and advantages of the present invention will be apparent from the following description of the preferred embodiments of the invention in conjunction with the accompanying drawings.

BRIEF DESCRIPTION OF THE DRAWINGS

FIG. 1A is a partial longitudinal sectional view of a rotary type powder compression molding apparatus according to one embodiment of the present invention and FIG. 1B is an enlarged view of a primary part of the apparatus shown in FIG. 1A;

FIGS. 2A to 2J are explanatory views showing steps of forming operation in the compression molding apparatus of FIG. 1A;

DETAILED DESCRIPTION OF PREFERRED EMBODIMENTS

Figure 3:
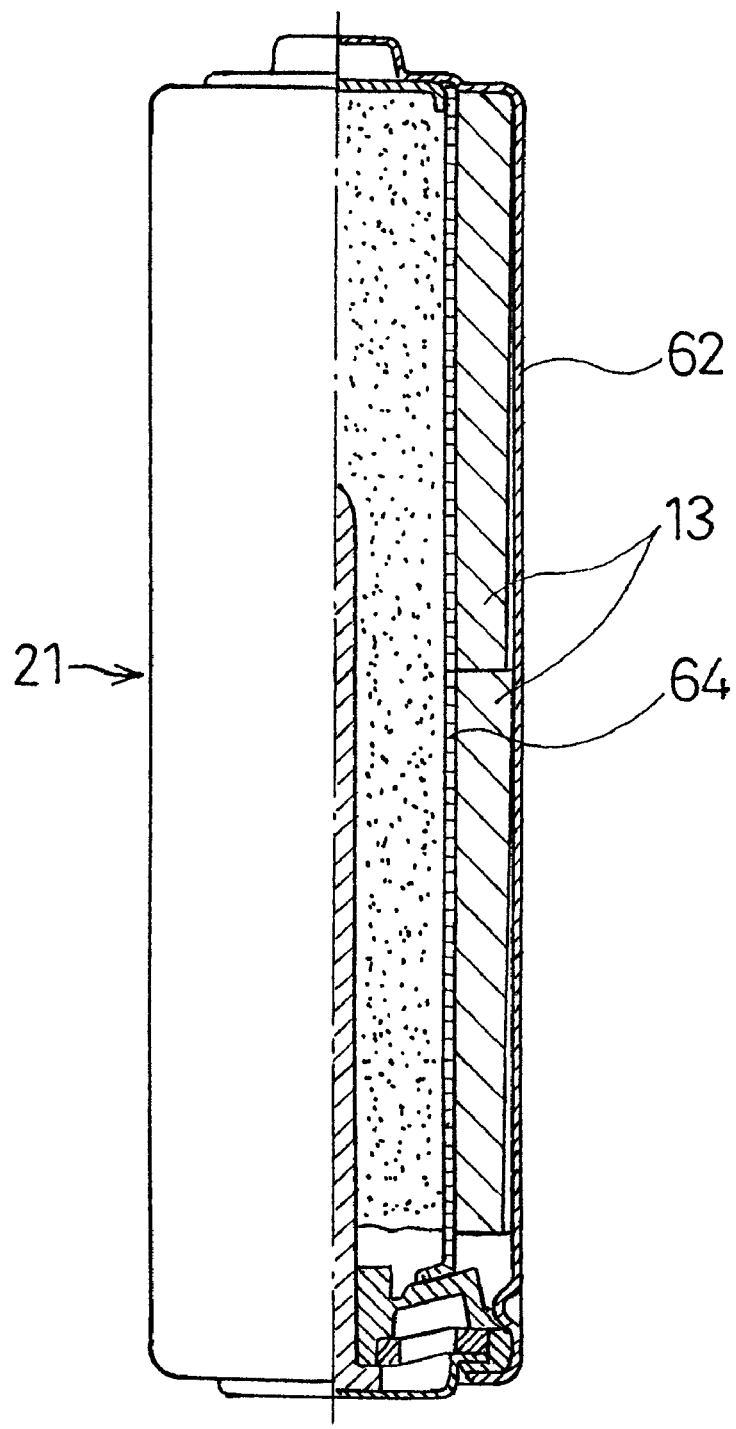
FIG. 3 is a half cross sectional front view of an alkaline manganese dry cell which contains cathode mixture pellets formed by the rotary powder compression molding apparatus of the present invention.

FIG. 1A is a partial longitudinal sectional view of a molding unit of a rotary type powder compression molding apparatus according to one embodiment of the present invention, and FIG. 1B is a longitudinal sectional view showing a primary part of the molding unit. Molding units 2 are arranged on a rotary disk 1 at equal intervals in a concentric circle about the center of rotation. Each molding unit 2 comprises a die 3 of a substantially cylindrical shape, a center pin 4 located in the center of the die 3, and a pair of lower and upper plungers 5, 6 for inserting from below and above respectively into an annular space defined between the die 3 and the center pin 4.

The die 3 is fixedly mounted to the rotary disk 1 and the center pin 4 is arranged for relative sliding movements in and along a center bore of the lower plunger 5. The lower plunger 5 and the upper plunger 6 are joined to the upper end of a lower lifting shaft 7 and the lower end of an upper lifting shaft 8, respectively, both being mounted to the rotary disk 1 for upward and downward movements.

End members 9, 10 serving as cam followers are coupled to the lower end of the lower lifting shaft 7 and the upper end of the upper lifting shaft 8, respectively, such that they are rotatable around the axis of the lifting shafts 7, 8. Magnets or O-rings are suitably provided to the end members 9, 10 for keeping them in position. This arrangement of end members being rotatably coupled to respective lifting shafts helps reduce adverse effects of local friction and/or abrasion of sliding parts. A lower and an upper pressure rollers 11, 12 are mounted at given locations in relation to the rotary disk 1, and the end members 9 and 10 come to engagement with the pressure rollers 11, 12 for the molding operation. Thus the end member 9 and the lower pressure roller 11 constitute a first lower plunger actuating cam means for driving the lower plunger 5 to carry out a molding action in the die 3. When the lower and the upper plungers 5, 6 are moved upward and downward by the corresponding actions of the lower and the upper lifting shafts 7, 8, they compress a powder mixture filled in the annular space between the die 3 and the center pin 4 to form a tubular pellet 13.

A cam follower 14 is detachably mounted to the center pin 4 at the lower end thereof by a cam follower pin 14a which extends through a guide hole 7a provided in the lower lifting shaft 7. The cam follower 14 is engaged with a center pin actuating cam 15 with a predetermined cam surface 15a, both constituting a center pin actuating cam means. The cam 15 has such a shape that the center pin 4 is lowered from the molding position before the powder mixture is supplied into the die 3, returned upward to the molding position for compression molding, and lifted further together with the pellet 13 stuck thereto as the lower plunger 5 moves upward to project from the die 3, before being lowered back to the molding position. The center pin 4 remains urged upwardly by the force of a spring 16 mounted between the lower end of the center pin 4 and the lower lifting shaft 7. Specific movements of the center pin 4 caused by the center pin actuating cam means will be described later in more detail.

A cam follower 17 is detachably mounted by a cam follower pin 17a to a side at the lower end of the lower lifting shaft 7. The cam follower 17 is engaged with a lower plunger actuating cam 18 hence constituting a second lower plunger actuating cam means. The cam 18 is so shaped that the lower plunger 5 is lowered from a given molding position in the annular space in the die 3 before the powder mixture is supplied into the die 3, returned upward to the molding position for carrying out the compression molding of the powder mixture filled in the annular space between the die 3 and the center pin 4 together with the upper plunger 6, and lifted further for unloading the molded pellet 13 from the die 3. Specific movements of the lower plunger 6 caused by the lower plunger actuating cam means will be described later in more detail. The upward ejecting operation of the pellet 13 from the die 3 is performed by the action of a third lower plunger actuating cam means composed of another cam 70 shown by the two-dot chain line in FIG. 1A being engaged with the end member 9. The lower plunger 5 is detachably tightened by a box nut 19 to the upper end of the lower lifting shaft 7.

In the rotary type powder compression molding apparatus of the present invention, the center pin 4 has a tip end 4a of a bullet-nose shape provided on the uppermost end thereof which is arcuate at tip and parabolic at side. The tip end 4a is designed for smoothly clearing the powder mixture P which comes to contact with the center pin 4 and not limited to its bullet-nose shape but may have a conical or pointed polygonal shape which is substantially acute at the tip and has smooth circumferential sides. A lower part 4b of the center pin 4 is slightly reduced in diameter so that an annular space or powder outlet passage 45 is provided between the lower plunger 5 and the lower part 4b of the center pin 4. The lower lifting shaft 7 also has a powder outlet aperture (not shown) provided therein and connected to this powder outlet passage 45. Thus, powder particles which entered the small clearance between the lower plunger 5 and the center pin 4 are automatically discharged through the powder outlet passage 45 to the outside, whereby friction or abrasion caused by powder particles is prevented and smooth sliding movement of the center pin 4 is ensured.

In order to reduce the stress exerted to the center pin 4 having such a lower part with a smaller diameter as much as possible, the cam mechanism for driving the center pin 4 has the following specific features. The center pin actuating cam 15 is provided with its cam surface 15a at upper side for directly accepting the cam follower 14 of the center pin 4 and spaced at lower side by a small distance from the cam follower 14. The cam follower 14 remains upwardly biased towards the cam surface 15a of the center pin actuating cam 15 by the force of a compression spring 16 disposed between the lower end of the center pin 4 and the lower lifting shaft 7. As the center pin 4 has a freedom of movement along vertical directions, it can be retracted downwardly against the force of the compression spring 16 on receiving a downward stress in the axial direction from the load generated in the compression molding or removal of pellets out of the die. In other words, the downward stress exerted to the center pin 4 is absorbed by the contracting action of the spring 16 and will not directly act on the center pin 4. This allows the lower part 4b of the center pin 4 to remain intact, as well as prevents any damage or distortion of the cam follower shaft 14a. Moreover, the spring 16 helps the cam follower 14 of the center pin 4 to smoothly track the cam surface 15a of the center pin actuating cam 15.

The upper lifting shaft 8 is provided with an upper plunger cam follower 48 at a side thereof. As the rotary disk 1 rotates, the cam follower 48 engages with an upper plunger actuating cam (not shown) mounted to a frame (not shown) and drives the upper lifting shaft 8 to lower the upper plunger 6 prior to the compression molding action. This action will be explained later. The upper plunger 6 is driven downward with the upper lifting shaft 8 by the engagement between the end member 10 and the upper pressure roller 12.

The procedure of forming pellets 13 with the rotary type powder compression molding apparatus of this embodiment is now described referring to FIGS. 2A–2J. FIG. 2A illustrates the molding unit of the apparatus at a time point after a previously molded pellet has been unloaded.

Before or during powder mixture is supplied, the lower plunger 5 and the center pin 4 are lowered to a predetermined position in relation to the die 3. The powder mixture P consisting of cathode materials for an alkaline manganese cell such as manganese dioxide and graphite is then heaped in and around the mouth of the die 3 with the use of the feed shoe 20 and the rotating movement of the rotary disk 1 as shown in FIG. 2B. At this time, the center pin 4 is sufficiently lowered to allow the powder mixture P to be fully filled in to the cylindrical space defined in the die 3. This is also effective to eliminate formation of bridges within the die 3, because bridges are less likely to form in a cylindrical space than would be in an annular space. The feeding of the powder is done as the rotary disk 1 rotates, which helps destroy any bridges that may be formed within the small confined space in the die. Furthermore, after the powder has been supplied in the die 3, the center pin 4 may be given impact to vibrate or vertically reciprocated several times, so as to ensure that no bridges are formed in the die 3 at this step.

The center pin 4 and the lower plunger 5 are then lifted a predetermined distance to their powder measurement positions, and the feed shoe 20 is slid on the top of the die 3 to remove an extra of the powder mixture P. This is to measure out a precise amount of powder required for forming the pellet 13. When the measurement is done, the upper end of the lower plunger 5 is located below the upper end of the center pin 4 by a given distance as shown in FIG. 2C. That is, the amount of the powder mixture P required for forming one pellet 13 is determined by the positions of the lower plunger 5 and the center pin 4 from the top end of the die 3. This positioning of the center pin 4 and the lower plunger 5 is controlled by the cam setting of the lower plunger actuating cam 18 and the center pin actuating cam 15.

After the precise amount of the powder mixture P is measured out, the center pin 4 and the lower plunger 5 is lowered to cause the surface of the powder mixture P to sink into the die 3 as shown in FIG. 2D. Before the center pin 4 is lifted upward so that its tip end 4a extends through the powder mixture P, the upper plunger 6 is lowered to close the opening of the die 3 with its bottom as shown in FIG. 2E. This lowering action of the upper plunger 6 is controlled by the upper plunger cam follower 48 mentioned above engaging with the upper plunger actuating cam (not shown).

This is followed by the step of lifting the center pin 4 to its molding position by the action of the cam follower 14 engaging with the cam surface 15a of the center pin actuating cam 15. During this step, as shown in FIG. 2F, the center pin 4 is controlled to vertically reciprocate as denoted by the arrow once or a plurality of times before reaching its molding position. This action causes any residual powder mixture P on the tip end 4a of the center pin 4 to be cleared away. The reciprocating action of the center pin 4 is carried out in a manner that the center pin 4 is given moderate shocks which generate vibration thereto.

The center pin 4 is then lifted and positioned for compression molding as shown in FIG. 2G. At this time, any powder mixture P remained on the tip end 4a of the center pin 4 has been dropped into the die 3 rather than scattered around by the reciprocating action of the center pin 4 owing to the upper plunger 6 closing the opening of the die 3. Thus the annular space between the die 3 and the center pin 4 is filled with a precise amount of the powder mixture P.

The powder mixture P in the annular space in the die 3 is then compressed from above and below by the upper plunger 6 and the lower plunger 5 as shown in FIG. 2H. After that, the upper plunger 6 is upwardly retracted and the lower plunger 5 and the center pin 4 are simultaneously lifted upward to push up the pellet 13 out of the die 3 as shown in FIG. 2I. At this time, a cell case 124 is held above the die 3 in alignment therewith as illustrated by phantom lines, and the center pin 4 enters this cell case, thereby achieving the coaxial positioning of the cell case and the pellet to be inserted therein.

Finally, as shown in FIG. 2J, the lower plunger 5 further pushes up the pellet 13 into the cell case 124, while the center pin 4 is downwardly drawn out from the pellet 13.

As described above, the center pin 4 and the lower plunger 5 are first lowered to their lowermost positions which are lower than the predetermined position of the annular molding space in the die 3 before supplying the powder mixture P into the annular space between the die 3 and the center pin 4, thereby preventing formation of bridges. After the heap of powder supplied on the die 3 has been leveled with the feed shoe 20, the center pin 4 and the lower plunger 5 are lowered, so that a precise amount of powder for one pellet sinks in the die. Then, the upper plunger 6 is lowered to close the die 3. This prevents escape of the powder mixture P from the die 3 during the successive lifting movement of the center pin 4. In this way, predetermined amount of powder that has been precisely measured and supplied in the die in the previous steps is retained within the die 3. Accordingly, desired measurement precision is constantly achieved in every molding cycle, whereby resultant pellets are uniform in weight and density.

When taking out the molded pellet 13 from the die 3, the center pin 4 is also lifted upward together with the lower plunger 5 until the pellet 13 is out of the die 3. In this way, even though the pellet is tightly stuck to the center pin 4 within the die 3, it is readily pushed up out of the die with the lower plunger 5. This ejecting action with the lower plunger 5 is carried out by the cam 70 denoted by the two-dot chain line in FIG. 1A and the end member 9 of the lower lifting shaft 7 engaged therewith.

According to the present invention, since it is only necessary to apply a force to the lower plunger 5 required for detaching the pellet 13 from the inner side of the die 3, the load exerted to the lower plunger 5 in ejecting out the pellet 13 is reduced to 20% to 50% as compared with the prior art structures. After lifting both of the center pin 4 and the lower plunger 5, the pellet 13 released from the containment in the die 3 is restored to a size which is 0.1 to 0.2 mm greater in both outer and inner diameters than it has been in the die 3. This allows the center pin 4 to be easily withdrawn from the pellet 13 without requiring extra force.

Therefore, it is possible to form cylindrical pellets, of which inner face is vertical and of which outer face is also substantially vertical. The molding apparatus of this embodiment is specifically adaptable for molding thin and high tubular pellets. Conventionally, pellets were forcibly lifted with a lower plunger to be released from strong engagement between the pellet and the die, and in order to facilitate this ejecting action, both sides of the pellet had to be tapered at considerable angles. With the apparatus described above, it is possible to form high and hollow cylindrical pellets of a very small thickness and with very little taper on their outer surfaces.

Table 1 shows the dimensions of cathode pellets produced in accordance with the present invention to be contained in dry cells from size D to size AAA. As can be seen, according to the present invention, it is even possible to mold cylindrical pellets of which height is greater than their outer diameter, and of which ratio of thickness to their outer diameter is extremely small. As described in the foregoing, the present invention molding apparatus is capable of satisfying stringent requirements for measurement precision particularly for the pellets for smaller batteries of size AA and size AAA.

TABLE 1

|  | Outer Diameter (mm) | Thickness (mm) | Inner Diameter (mm) | Height (mm) | Height/ Outer Diameter | Thickness/ Outer Diameter |
|---|---|---|---|---|---|---|
| Type D | 32.1 | 5.35 | 21.4 | 24.1 | 0.75 | 0.17 |
| Type A | 24.5 | 3.8 | 16.9 | 19.2 | 0.78 | 0.16 |
| Type AA | 13.3 | 2.0 | 9.3 | 22.0 | 1.65 | 0.15 |
| Type AAA | 9.7 | 1.45 | 6.8 | 19.1 | 1.97 | 0.15 |

Since the pellets for batteries of size D and size A have a smaller ratio of height to outer diameter than the pellets for size AA and size AAA, these pellets can be molded in the apparatus of the present invention without any taper at all on the inner face. The outer face of the pellets are only very slightly tapered and substantially vertical. Even for the pellets for smaller batteries of size AA and size AAA, at least the inner side of the pellet 13 can be formed straight, perpendicularly to a diametral plane. The outer side need be tapered only at a very small angle.

Figure 10:
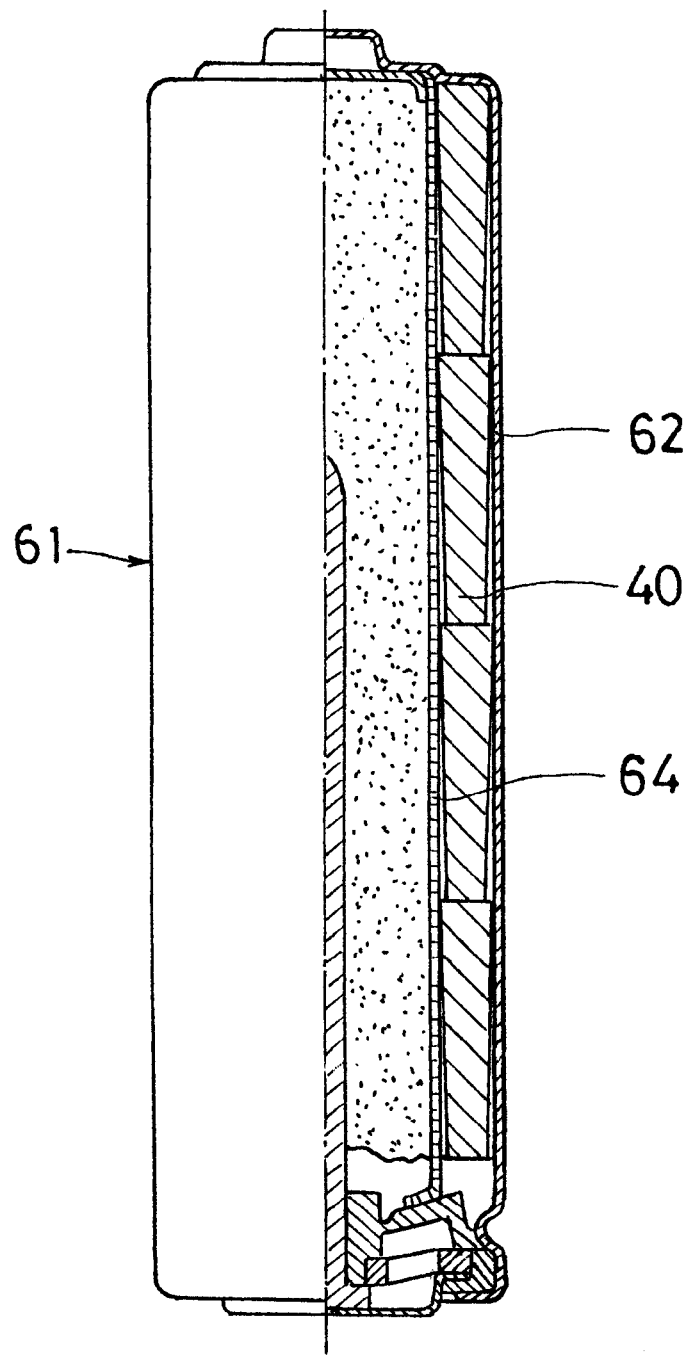
FIG. 10 is a half cross sectional front view of an alkaline manganese dry cell which contains cathode mixture pellets formed by the conventional apparatus.

Thus the present invention enables cathode pellets having a greater height and being virtually cylindrical to be produced from a powdery material of cathode mixture, which is most suitable for a dry cell. As compared with a conventional dry cell shown in FIG. 10, the cathode pellet 13 produced by the method and apparatus of the present invention has a greater height as shown in FIG. 3. As a result, at least for the batteries of size AA and size AAA, it is now possible to constitute a dry cell 21 with only two of the cathode pellets. This reduces the number of steps for producing the dry cells, increases productivity, and reduces the cost of production. Alkaline manganese dry cells are produced in a well known manner that an anode material is filled in an inner space formed by the two tubular pellets of cathode material with an intervening separator 64 therebetween.

The alkaline-manganese dry cell 21 contains the cathode pellets 13 of which sides are substantially perpendicular to a diametral plane or only slightly tapered. As the quantity of the cathode mixture is increased in the cell case 62, the overall performance of the dry cell is enhanced. Also, the clearances between the inner side of the cathode pellet 13 and the separator 64 and between the outer side of the same and the cell case 62 are minimized hence allowing the supply of a higher current.

Figure 4:
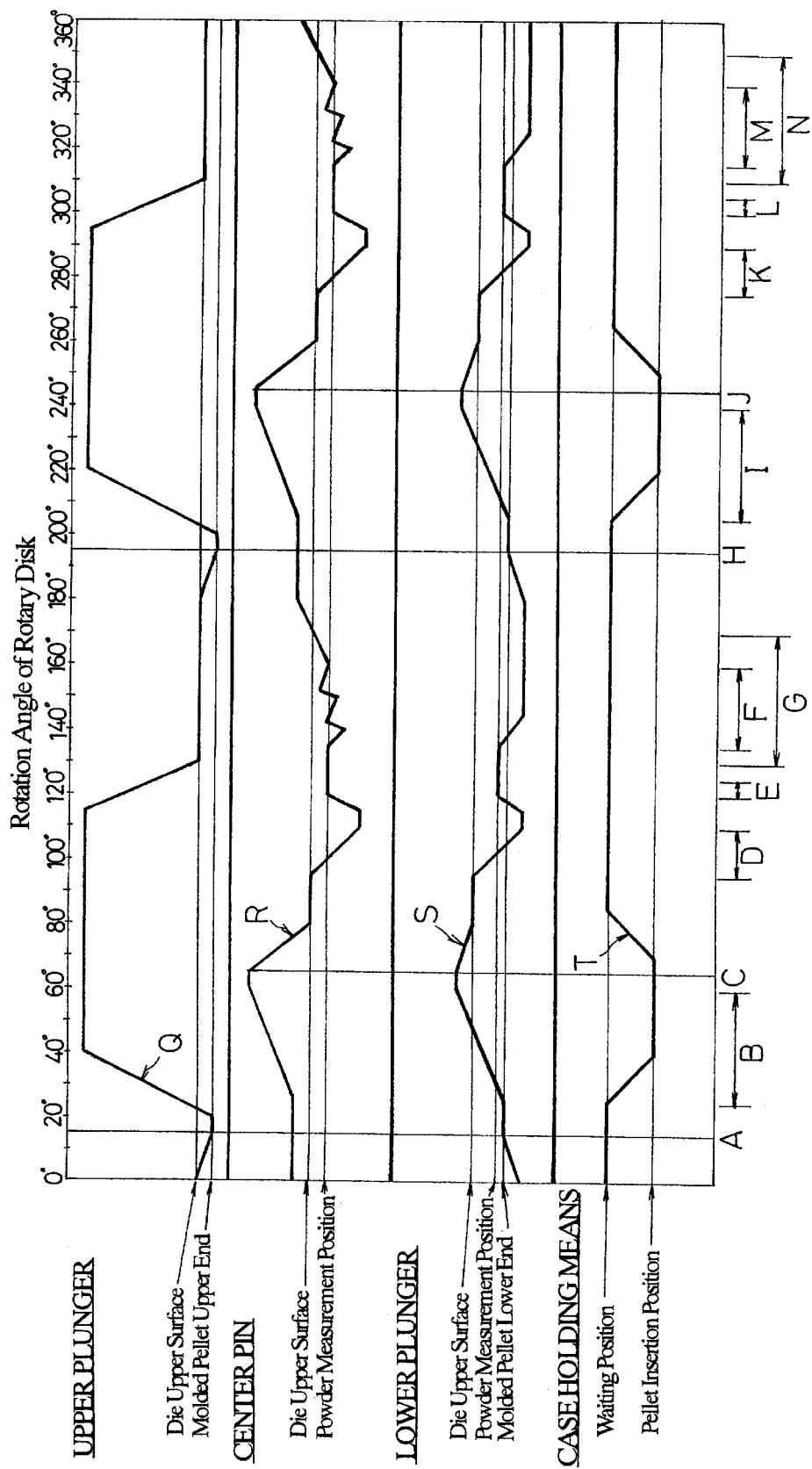
FIG. 4 is a time chart diagram showing the positions of various components of the molding unit at each angle of the rotary disk.

FIG. 4 is a time chart showing the positions of the upper plunger, the center pin, the lower plunger, and the case holding means to be described later, at each rotation angle of the rotary disk as it makes one round. In the drawing, the lines denoted at reference designator characters Q, R, S, and T respectively indicate the changes in positions of the lower end of the upper plunger, the upper end of the center pin, the upper end of the lower plunger, and the vertical axis of the case holding means. It should be noted that the upper plunger, the center pin, and the lower plunger are moved vertically, whereas the case holding means is moved horizontally.

At step A, the compression molding of a first pellet has just been finished. During step B, the upper plunger 6 is lifted upwards, so that the case holding means holding a cell case 124 is able to be advanced to a pellet insertion position above the die 3. The center pin 4 and the lower plunger 5 are simultaneously lifted upwards to move the pellet out of the die 3, so that, at step C, the pellet is inserted into the cell case 124 by the lower plunger 5, guided by the center pin 4, which is located higher than the lower plunger 5 and has entered the cell case prior to the lower plunger. The case holding means is then retracted to its waiting position, and the center pin 4 and the lower plunger 5 are lowered to their initial positions for starting compression molding of the next pellet.

At step D, both of the center pin 4 and the lower plunger 5 are lowered to receive the powder mixture abundantly into the die 3. As mentioned above, the center pin 4 may be vertically reciprocated several times at this step. The center pin 4 and the lower plunger 5 are then lifted to their predetermined powder measurement positions, by which the amount of powder contained in one pellet is determined, and the heap of powder supplied in and on the die 3 is leveled with the shoe 20 at step E. As indicated by the line Q, after the measuring out of powder for one pellet, the upper plunger 6 is lowered to close the upper open end of the die 3. In this way, during the successive step denoted at G, the powder is prevented from scattering around. At step F, the lower plunger 5 is lowered, so that the powder filled in the die sinks from the die upper surface, and the center pin 4 is vertically reciprocated several times. Then the center pin 4 is lifted to its molding position, whereupon the upper plunger 6 and the lower plunger 5 are pressed in molding directions respectively with the pressure rollers 12, 11. Steps H to N are the same as steps A to G. Thus two pellets are successively formed in one round of the rotary disk 1, and automatically loaded into an identical cell case one after another.

Next, a rotary type powder compression molding assembly system according to the present invention will be described referring to FIGS. 5 to 7.

Figure 5:
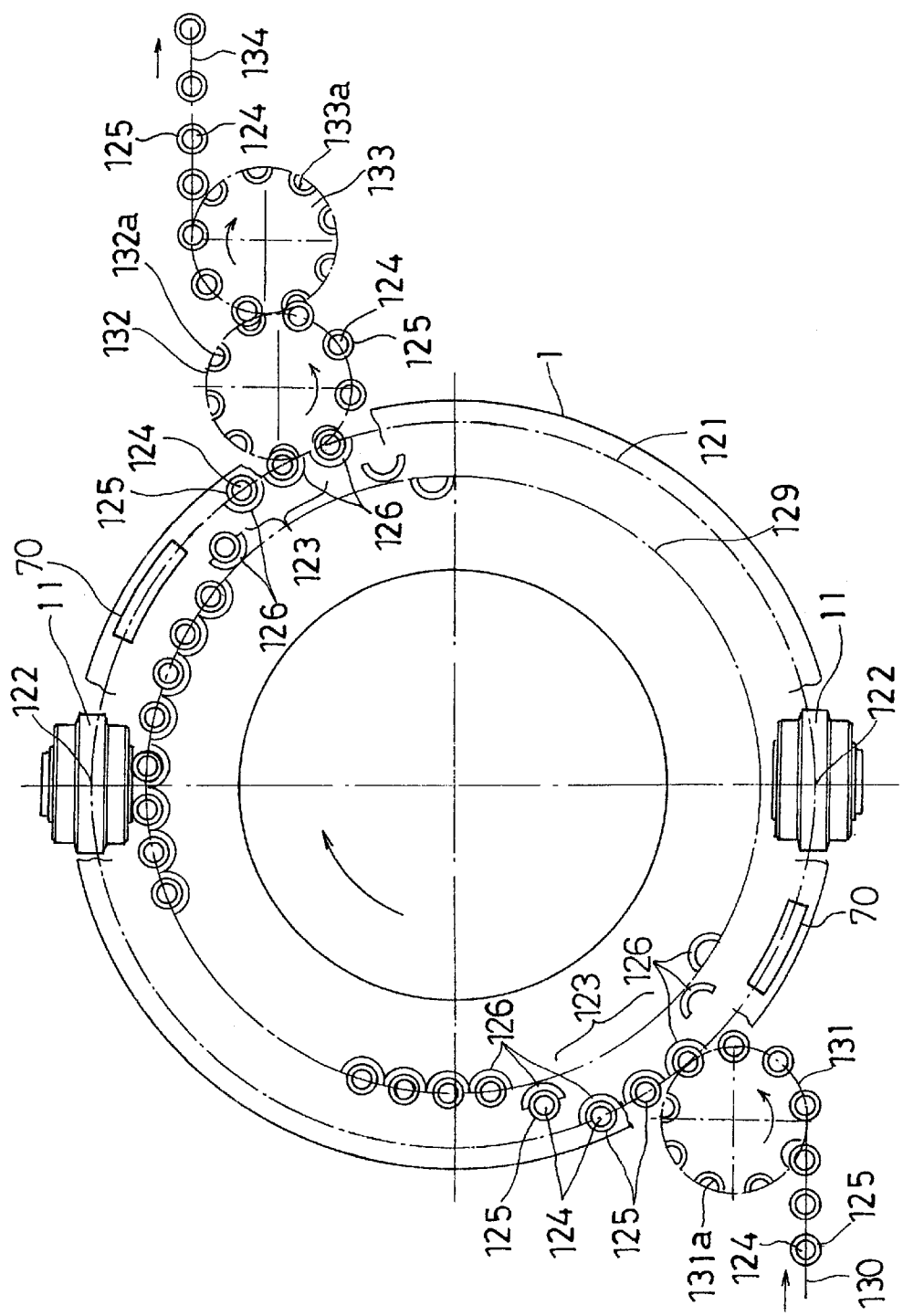
FIG. 5 is a schematic plan view of an entire rotary type powder compression molding assembly system according to one embodiment of the present invention.
Figure 6:
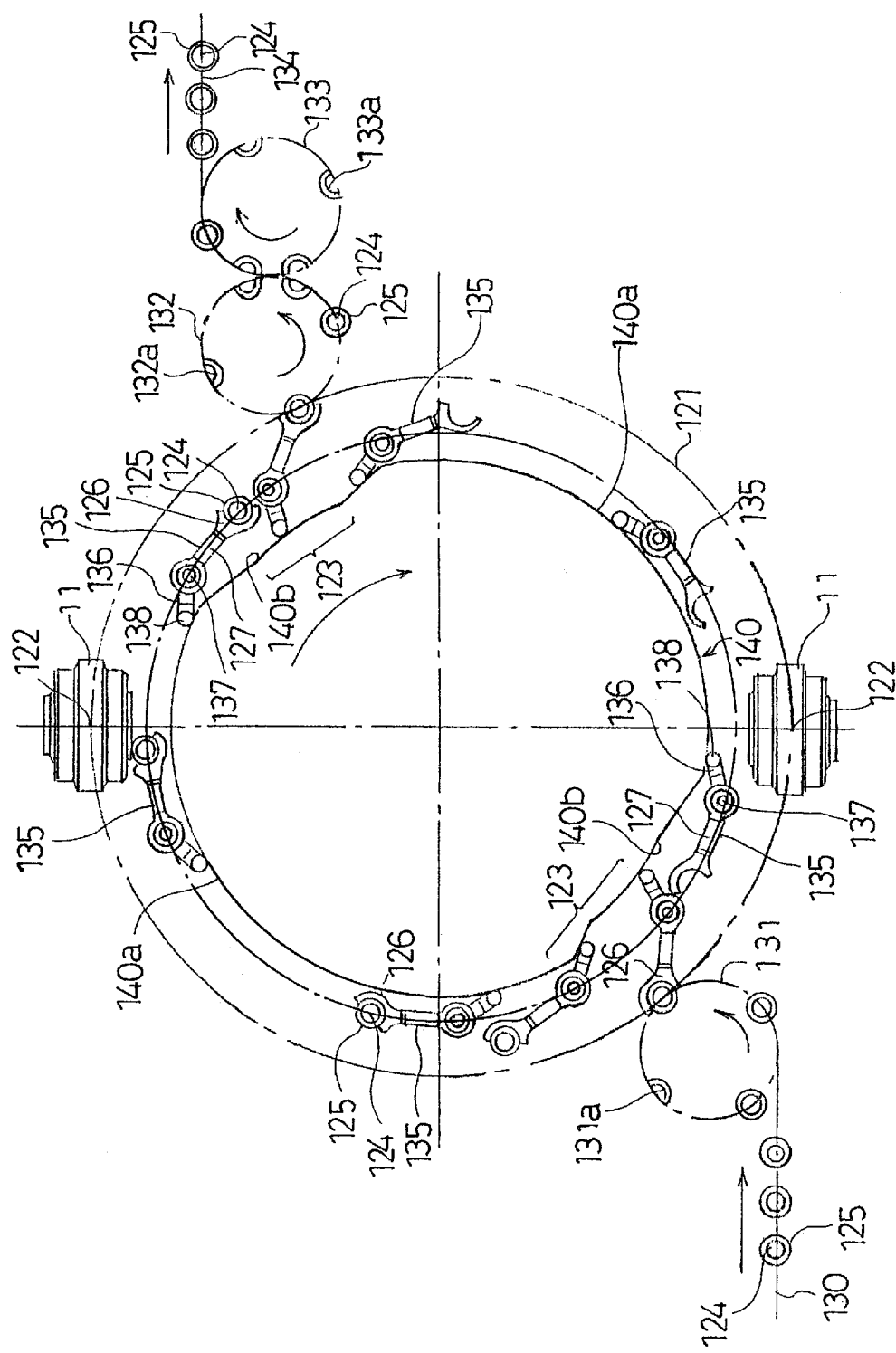
FIG. 6 is a schematic plan view showing the action of operating levers of the rotary type powder compression molding assembly system of FIG. 5.

In FIGS. 5 and 6, although not shown, a plurality of molding units 2 are mounted at equal intervals on a concentric circle about the center of rotation of the rotary disk 1. The circle or movement path of the molding units 2 with the rotation of the rotary disk 1 is denoted by the reference numeral 121. The molding units 2 are identical to the one shown in FIGS. 1A and 1B and will be explained in no more detail. The procedure of forming the pellet is as previously described with reference to FIGS. 2A–2J.

As best shown in the schematic plan view of the rotary type powder compression molding assembly system of FIG. 5, a couple of compression molding stations 122, each having the lower pressure roller 11 and the upper pressure roller 12, are disposed on the movement path 121 of the molding units 2 on the rotary disk 1 opposite each other in the radial direction. Also, insertion assembly stations 123 are disposed on the downstream side of each of the compression molding stations 122 along the movement path on the rotary disk 1.

Figure 7:
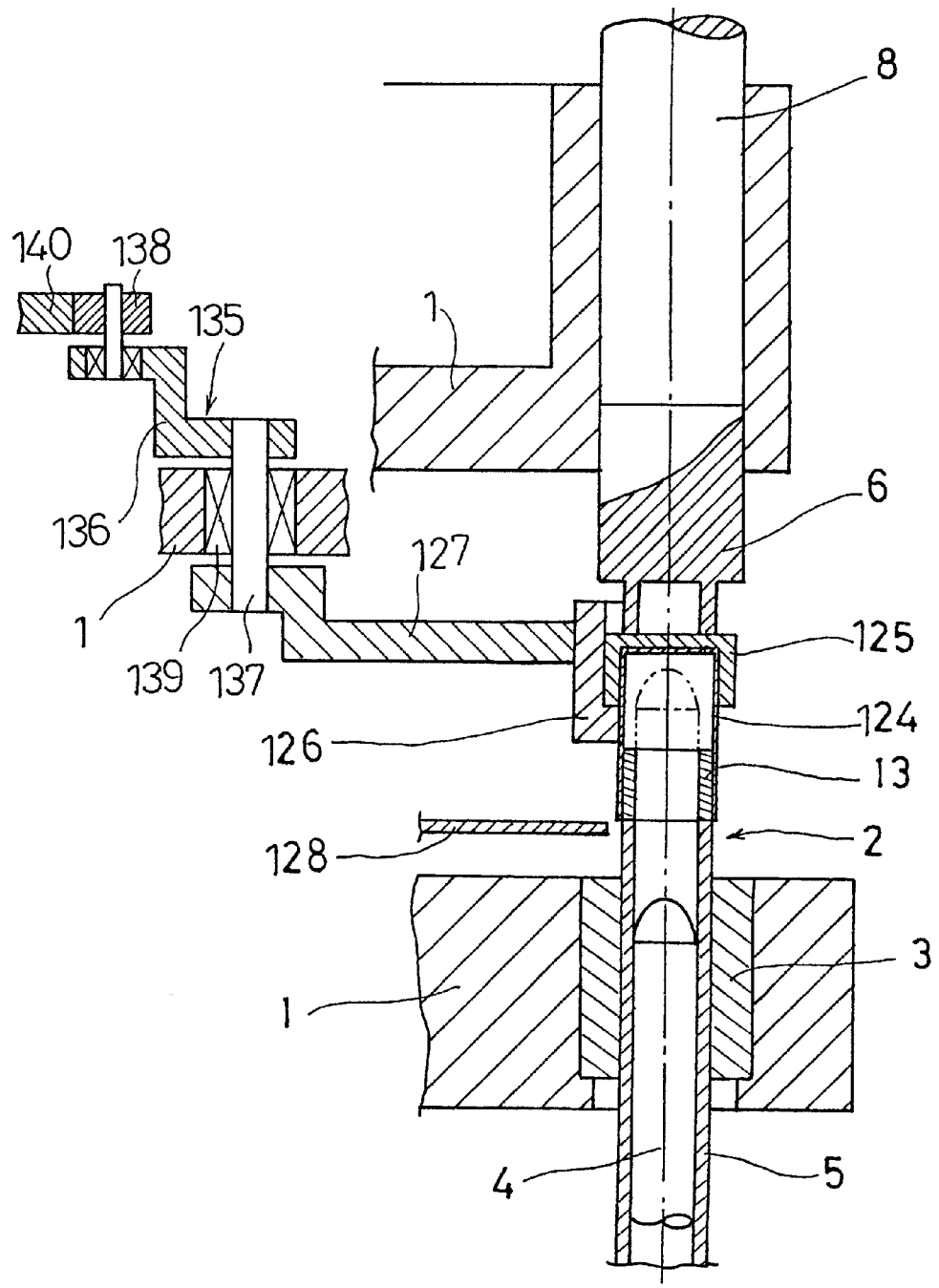
FIG. 7 is a partial longitudinal sectional view of a molding unit and a case holding means in an insertion assembly station of the rotary type powder compression molding assembly system of FIG. 5.
Figure 8:
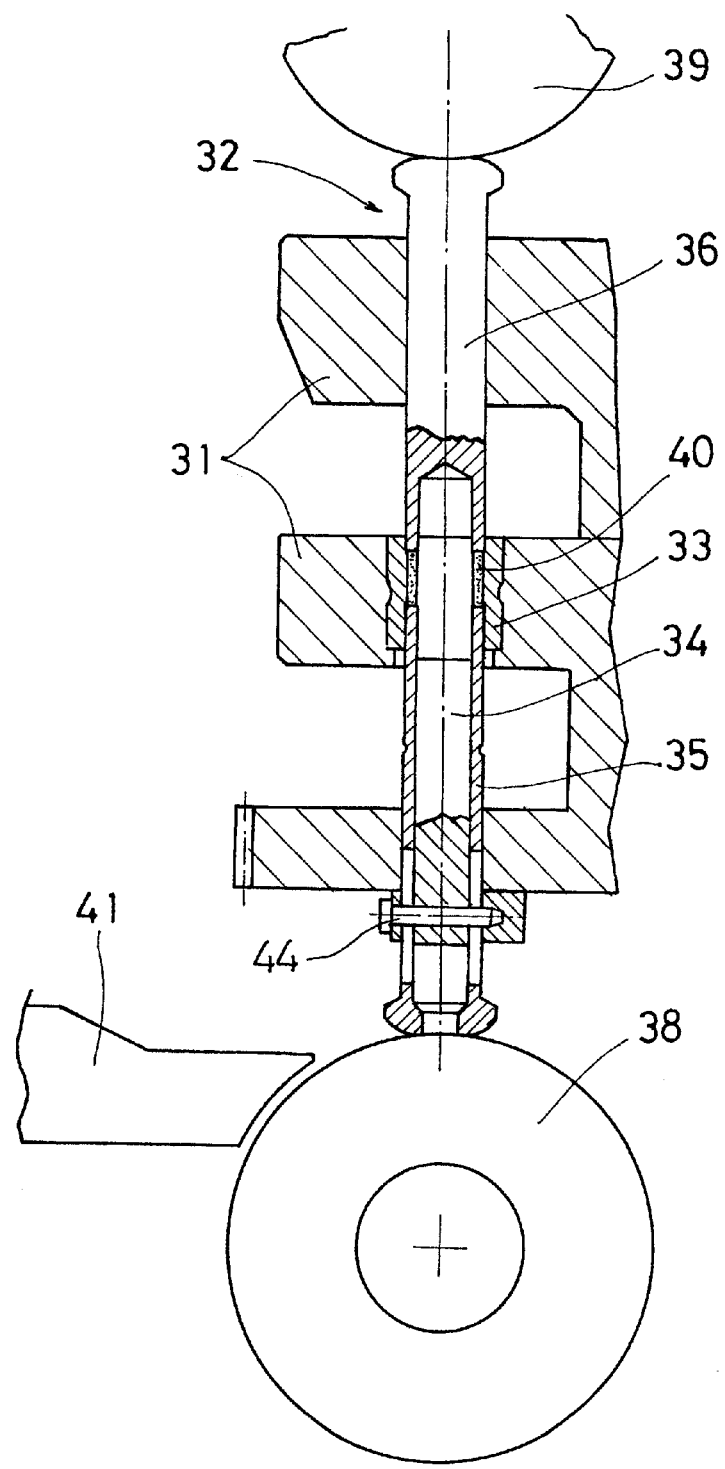
FIG. 8 is a longitudinal sectional view of the molding unit of a conventional rotary powder compression molding apparatus for forming ring-like pellets.
Figures 9A, 9B, 9C:
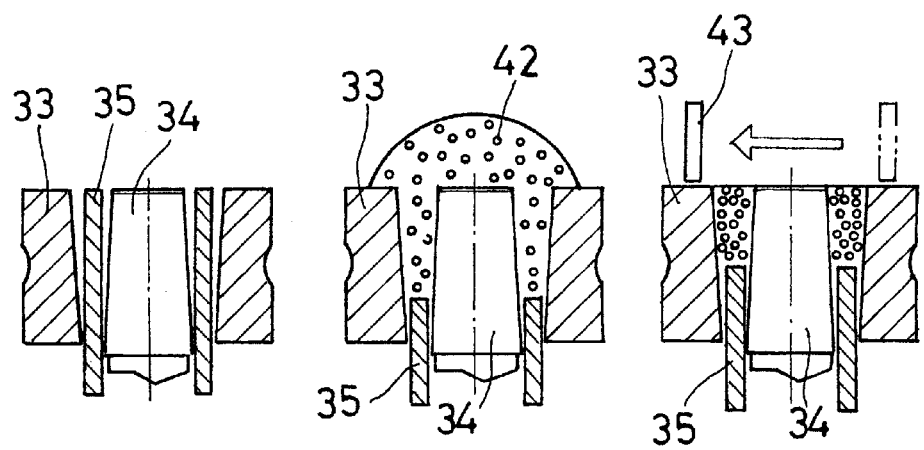
FIGS. 9A to 9E are explanatory views showing steps of forming operation in the conventional apparatus of FIG. 8.
Figures 9D, 9E:
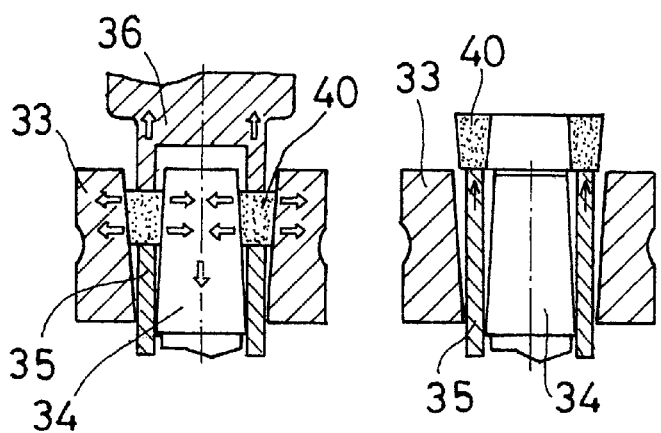

After the pellet 13 is formed in the compression molding station 122, a case 124 to be filled with the pellets 13 is brought in with its opening facing down and held vertically just above the die 3 while the upper plunger 6 is upwardly retracted as shown in FIG. 7. The case 124 is carried at its bottom with a cylindrical convey jig 125 which is held by a case holding means 126 mounted on the rotary disk 1 corresponding to each molding unit 2. The inner wall surface of the case 124 is preliminarily coated with carbon and/or graphite, in order to reduce the internal resistance. A magnet (not shown) for magnetically holding the case 124 is embedded in the case holding means 126 while a steel ring is embedded in the convey jig 125 for being magnetically attracted together with the case 124 by the case holding means 126.

Referring to FIG. 5, the convey jig 125 holding the case 124 with its opening down is carried on a case carrying-in conveyor 130 and received by a semicircular groove 131*a* of a case carrying-in disk 131. The convey jig 125 is then transferred from the case carrying-in disk 131 to the case holding means 126 on the rotary disk 1 at the entrance of the insertion assembly station 123 (at the left hand side in FIG. 5). The case holding means 126 is formed to have a semicircular cross section for magnetically holding the outer surface of the cylindrical convey jig 125 and driven by an operating lever 135 described later with reference to FIG. 6, for advancing and retracting movements in the radial direction of the rotary disk 1. The case holding means 126 comes just above the die 3 in the molding unit 2 only when reaching each of the insertion assembly stations 123 and otherwise remains at its radially retracted position where it does not disturb the action of the molding unit 2. In this embodiment, the case 124 is filled with two of the pellets 13 formed by the compression molding action in the two compression molding stations 122 respectively. Denoted at the reference numeral 129 in FIG. 5 is a movement path of the case holding means 126 at its retracted position. As shown in FIG. 7, when the case holding means 126 is withdrawn from the insertion assembly station 123 to its retracted position, the pellet 13 loaded in the case 124 is supported by a support plate 128.

The case 124 when loaded with the second pellet 13 at the exit of the insertion assembly station 123 (at the right hand side in FIG. 5) is received by a semicircular groove 132*a* of a first case carrying-out disk 132 while being held by the convey jig 125. The case 124 is further transferred from a semicircular groove 133*a* of a second case removing disk 133 to a case carrying-out conveyor 134 for being moved on to the next step.

FIG. 6 is a schematic plan view showing the action of the case 124 and the operating lever 135 for holding and transferring the convey jig 125 which carries the case 124. As shown in FIGS. 6 and 7, the operating lever 135 mounted to each of the molding units 2 comprises a support arm 127, to which the case holding means 126 is joined at the distal end thereof, and an actuating arm 136 having a cam follower 138 consisting of a roller and being mounted to the distal end thereof for rotating action, both being fixedly mounted to either end of a support shaft 137 respectively so as to project toward both sides at predetermined angles from the support shaft 137. The support shaft 137 of the operating lever 135 is rotatably mounted by a bearing 139 to the rotary disk 1. The cam follower 138 remains biased against a cam 140 by the force of a spring (not shown). The cam 140 is secured in coaxial arrangement with the rotary disk 1 and includes a first arcuate cam surface 140a and a second cam surface 140b as shown in FIG. 6. The arcuate cam surface 140a causes the case holding means 126 to stay at its retracted position on the movement path 129 shown in FIG. 5. The second cam surface 140b is provided at each of the insertion assembly stations 123, and has a profile such as to cause the case holding means 126 to advance to the position just above the die 3, and to return therefrom to its retracted position.

Pellets 13 are formed and loaded into the case 124 in the following manner. After the preceding pellet 13 is removed as shown in FIG. 2A, the lower plunger 5 and the center pin 4 are lowered to fill the die 3 with a sufficient amount of powder mixture P without developing bridges as shown in FIG. 2B. The powder mixture P is measured out to a precise amount with the feed shoe 20 as shown in FIG. 2C. The lower plunger 5 is lowered, and the upper plunger 6 is also lowered to close the opening of the die 3, as shown in FIGS. 2D and 2E. The center pin 4 is vertically reciprocated as shown in FIG. 2F, and lifted to the molding position as shown in FIG. 2G. The powder mixture P is then compressed from upper and lower sides by the upper plunger 6 and the lower plunger 5 to form the pellet 13. At this time, the molding unit 2 is positioned at the compression molding station 122.

This is followed by the step of retracting the upper plunger 6 upwardly and unloading the formed pellet 13 from the die 3 by lifting up the center pin 4 together with the lower plunger 5 as shown in FIG. 2I. By this time, the molding unit 2 is positioned at one of the insertion assembly stations 123. Then, the pellet 13 is loaded into the case 124, which has been transferred by the case carrying-in conveyor 130 and is held by the case holding means 126 just above and coaxially with the die 3.

The case 124 held by the case holding means 126 is then moved back to its retracted position. In the molding unit 2, the pellet 13 is molded according to the steps of procedure shown in FIGS. 2A–2J before being conveyed to another insertion assembly station 123. At the next insert assembly station 123, the case holding means 126 is again returned to the movement path of the molding unit 2, so that the second pellet 13 is loaded into the case 124 from below to the previously inserted pellet 13 according to the step of procedure shown in FIGS. 2J and 7, before the case is conveyed to the case carrying-out conveyor 134.

As described above, since the high, cylindrical pellets of extremely small thickness, that require delicate handling, are inserted into the case 124 immediately after the forming operation of pellets, there is no danger that the formed pellets are physically damaged during transportation. The system includes both the molding apparatus and the assembling mechanism in a simple and compact structure, in which the pellet loading units are arranged along a concentric circle of the rotary molding apparatus on which they are advanced to and retracted from the molding units at proper timings so that they do not obstruct the molding action of the molding unit in any way. Moreover, since the cell cases 124 are firmly held with convey jigs or any other appropriate case holding means throughout the process, no problems occur resulting from unstable holding of the cell cases as would occur in conventional belt conveyor systems or the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A powder compression molding method for producing hollow cylindrical pellets comprising the steps of:
   lowering a lower plunger and a center pin both mounted coaxially in a cylindrical die to a first position;
   supplying a powder into the cylindrical die;
   lifting the lower plunger and the center pin to a second position;
   removing an extra of the powder to cause a given amount of the powder corresponding to one pellet to remain in the die;
   lowering an upper plunger to close the cylindrical die at a top end thereof with a lower end of the upper plunger;
   lifting up the center pin to extend through the powder, thereby defining an annular molding space between the center pin and the cylindrical die;
   compressing the powder in the annular space between the upper plunger and the lower plunger to form the pellet;
   lifting up the center pin simultaneously with the lower plunger to push the formed pellet upwardly to the outside; and
   withdrawing the center pin from the pellet after the center pin and the pellet have been transferred from the annular molding space.

2. The powder compression molding method according to claim 1, wherein the powder contains electrode materials for dry cells.

3. The powder compression molding method according to claim 2, wherein the electrode materials include manganese dioxide and graphite.

4. The powder compression molding method according to claim 2, wherein the dry cells are one of size AA type and size AAA type.

5. The powder compression molding method according to claim 2, wherein the pellets have no self-releasing taper on an inner side face thereof.

6. The powder compression molding method according to claim 2, wherein the dry cells each contain two pellets.

7. The powder compression molding method according to claim 1, wherein, in the step of supplying the powder into the die, the center pin is vertically reciprocated a plurality of times.

8. The powder compression molding method according to claim 1, wherein, in the step of lifting up the center pin to extend through the powder, the center pin is vertically reciprocated a plurality of times.

9. The powder compression molding method according to claim 1, wherein the center pin has a straight side face and a pointed tip.

10. The powder compression molding method according to claim 1, further comprising a step of inserting the formed pellet into a cylindrical container which is held in position over and in alignment with the cylindrical die.

11. The powder compression molding method according to claim 10, wherein the center pin enters the cylindrical container prior to the insertion of pellet thereinto for positioning the pellet coaxial to the cylindrical container.

12. A powder compression molding method for producing hollow cylindrical cathode pellets for battery dry cell containers, comprising the steps of:

lowering a lower plunger and a center pin both mounted coaxially in a cylindrical die having a diameter of a size for a battery dry cell;

supplying cathode electrode powder into the cylindrical die;

lifting the lower plunger and the center pin to a second position;

removing excess cathode electrode powder to cause a predetermined amount of the cathode powder corresponding to one cathode electrode pellet to remain in the die;

lowering an upper plunger to close the cylindrical die at a top end thereof with a lower end of the upper plunger;

lifting up the center pin to extend through the cathode powder, thereby defining an annular molding space between the center pin and the cylindrical die;

compressing the cathode powder in the annular space between the upper plunger and the lower plunger to form the cathode electrode pellet;

lifting up the center pin simultaneously with the lower plunger to push the formed cathode electrode pellet upwardly to the outside of the die; and withdrawing the center pin from the cathode electrode pellet after the center pin and the pellet have been transferred from the annular molding space.

13. The powder compression molding method according to claim 12, wherein the cathode electrode powder includes manganese dioxide and graphite.

14. The powder compression molding method according to claim 13 wherein cylindrical die diameter accommodates one of a size AA dry cell container and a size AAA dry cell container.

15. The powder compression molding method according to claim 14, wherein the pellets have straight cylindrical sides on an inner side face thereof.

16. The powder compression molding method according to claim 15, wherein in the step of supplying the cathode electrode powder into the die, the center pin is vertically reciprocated a plurality of times to agitate the cathode electrode powder.

17. The powder compression molding method according to claim 16, wherein in the step of lifting up the center pin to extend through the cathode electrode powder, the center pin is vertically reciprocated a plurality of times.

18. The powder compression molding method according to claim 17, wherein the center pin has a straight side face and a pointed tip.

19. The powder compression molding method according to claim 14, further comprising a step of inserting the formed cathode electrode pellet into a cylindrical dry cell container which is held in position over and in alignment with the cylindrical die.

20. The powder compression molding method according to claim 19, wherein the center pin enters the cylindrical dry cell container prior to the insertion of pellet thereinto for positioning the pellet coaxial to the cylindrical dry cell container.

* * * * *